June 21, 1955 M. H. R. COGAN 2,711,308
GRID TRAY CONTACT COLUMN
Filed Dec. 16, 1952 2 Sheets-Sheet 1

Inventor:
Myles H.R. Cogan
By Oswald H. Milmore
His Attorney

June 21, 1955    M. H. R. COGAN    2,711,308
GRID TRAY CONTACT COLUMN

Filed Dec. 16, 1952    2 Sheets-Sheet 2

Inventor:
Myles H.R. Cogan
By: Oswald H. Milmore
His Attorney

United States Patent Office 2,711,308
Patented June 21, 1955

2,711,308
GRID TRAY CONTACT COLUMN

Myles H. R. Cogan, Houston, Tex., assignor to Shell Development Company, Emeryville, Calif., a corporation of Delaware Application December 16, 1952, Serial No. 326,330

10 Claims. (Cl. 261—113)

This invention relates to contact columns having grid trays built up of grid bars that are spaced apart to afford openings, such as slots, for the passage of fluent materials. Such trays find particular application for fractionating columns wherein descending liquid and ascending gas (which term is used herein to include vapor) flow in countercurrent through the openings but may be employed also for other purposes, such as the scrubbing of air, smoke and other gases with liquids or in processes wherein the fluent material is a finely divided solid such as sand or a catalyst suspended in a gas, or for countercurrent liquid-liquid contacting.

In installations wherein the fluent material is corrosive or erosive it becomes impracticable to employ the usual arrangements for mounting the trays within the column. The instant invention is concerned particularly with an improved construction and mounting of the trays within the column that is better suited to such operating conditions. The invention is further concerned with a contact column that has a ceramic lining and with a mounting arrangement suitable for installing grid trays within a lined column.

In summary, according to the instant invention, the enclosing wall that defines the contacting tank or column, and which is advantageously lined with bricks, is provided with a peripheral ledge at each tray level and an annular leveling support or a leveling ring is preferably provided on the ledge. The tray is built up of discrete grid bars supported by the ledge (resting directly on the leveling ring, when provided) and separated by suitable spacers to provide openings between bars, e. g., in the form of slots. The grid bars are retained by a hold-down member, such as a ring, which is held in position by retaining means such as bricks that extend into recesses in the wall.

The invention will be further described with reference to the accompanying drawing forming a part of this specification and illustrating one preferred embodiment of the invention, wherein.

Figure 1:
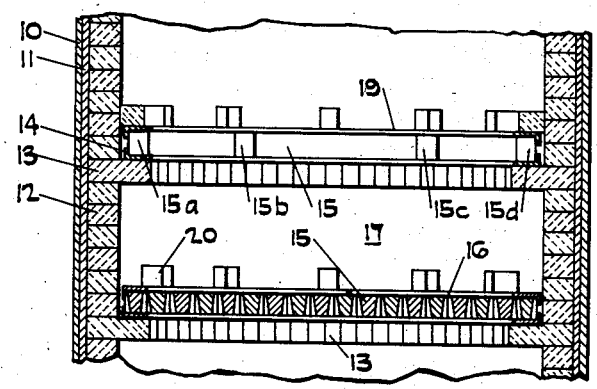
Fig. 1 is a vertical section view through a portion of a column constructed in accordance with the invention.

Referring to the drawings in detail, the contacting column comprises an outer, cylindrical upright shell 10 that may have suitable openings for the admission and discharge of the fluent materials to be passed through the column. Since the invention is not concerned with the particular arrangements for the control and passage of such fluent materials no further description thereof is made herein. The column may, if desired, have a lead lining 11 adjacent the shell 10. The column is lined with ceramic bricks 12, which are suitably cemented. Immediately below each tray level all or some of the bricks of one course are laid to project radially inwards from the wall as shown at 13 to provide a peripherally continuous or discontinuous supporting ledge. A leveling ring 14 having an upstanding lip or flange 14a at the outer edge is laid on each supporting ledge and may be leveled by laying it in mortar which fills the vertical interval between the ledge and leveling ring.

The grid tray proper consists of a plurality of discrete grid bars 15 that are laid side-by-side, in parallel relation on the leveling ring. These bars may be made of suitable corrosion-resistant or erosion-resistant material, depending upon the service to which the column is to be placed; thus, they may be made of cast metal or ceramic. Each bar has a plurality of lateral enlargements 15a–15d, inclusive, on at least one side thereof and, if desired, on both sides as shown in the drawing, forming spacers. It may be noted that while four enlargements, spaced longitudinally along the bars are shown, the number may be varied. Thus, in large-diameter columns a greater number may be useful while in small-diameter columns, when permitted by the rigidity of the bars, fewer spacers may be used. The spacers of each bar are in engagement with the adjacent bar, leaving intervening openings 16 for the passage of the fluent materials. In the preferred embodiment illustrated these openings are in the form of slots, and the widths of such slots are uniform throughout any one tray. Further, it should be noted that in this embodiment the trays extend over the full cross sectional area of the column, whereby the said slots form the only openings for the upward flow of gas and the downward flow of liquid through the tray.

Figures 3, 4, 5:
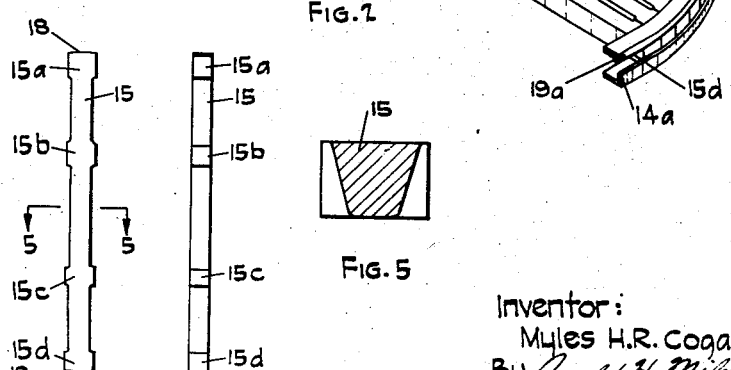
Fig. 3 is a plan view of one of the grid bars.
Fig. 4 is a side elevation view of one of the grid bars.
Fig. 5 is an enlarged cross section view of one of the grid bars taken on line 5—5 of Fig. 3.

The cross sectional shapes of the grid bars intermediate the spacers determine the shape of the slot. The instant invention is not concerned with any specific shape for such bars and slots, and the trapezoidal shape of the bar shown in Fig. 5, resulting in a slot that converges to the top, although preferred in many cases, is merely illustrative. Without restricting the scope of the invention, it may be stated that grid bars of the type illustrated, when used for distillation columns, are usually spaced apart to provide between them slots 16 that are between about 0.05 and 1.0 inch in width, spacings between 0.1 and 0.6 inch being usually most suitable, and the bar widths are selected in relation to the slot widths so that the aggregate of the slot areas through the tray (measured at the narrowest parts of the slots and herein referred to as the free area) is from about 7 to 40% of the total area of the grid, free areas of from about 10 to 20% being most commonly used. Such trays are spaced apart vertically to provide intervening spray contact spaces 17 for the upward flow of atomized liquid to provide intimate contact between liquid and gas. These spaces are, for best results, made high enough to permit disengagement of the liquid droplets, so that the gas can ascend through the next higher tray without carrying over any appreciable quantity of liquid. Too close a vertical tray spacing limits the permissible gas flow rate and also the load point, i. e., the rate of gas flow at which liquid is prevented from descending through the slots in sufficient amount to maintain the necessary flow of liquid and at which the column therefore becomes inoperative due to flooding. In general, it is desirable in distillation columns to space such trays apart by distances at least about three times the bar widths, and spacings from three to thirty inches are typical. The trays may be oriented as desired, e. g., as shown in Fig. 1 with the bars of each tray at right angles to those of the adjacent trays.

As was indicated above, the grid bars are discrete, being made of separate pieces and simply laid on the leveling ring in close juxtaposition. The lengths of the bars are graduated to conform to the interior diameter of the column and the ends may be rounded as indicated at 18 to conform to the lip 14a leaving only a slight clearance for expansion. The bars are clamped down by a peripheral hold-down 19 having a dependent flange or lip 19a which contacts the upper faces and the ends of the bars near the column wall. The hold-down 19 is retained in position securely by suitable retaining means fixed to the column wall. Such retaining means advantageously comprises a plurality of key bricks 20 that extend into recesses formed in the brick lining and which are cemented into place.

The leveling support 14 and hold-down 19 are made of suitable corrosion-resistant or erosion-resistant material, preferably metal. They may be continuous annular rings or may be formed of two or more sectors for convenience in installation and removal. The lips 14a and 19a prevent displacement of the support and hold-down radially and are particularly useful when these members are formed in separate sections; with any slight expansion, the grid bar assembly would push against lip 19a, moving the top ring sectors 19 horizontally since the key bricks 20 secure the top ring sectors firmly but are not sufficiently bonded thereto to prevent movement.

It will be noted that grid bars are symmetrical about the center line of the tray parallel with the bars; therefore it is necessary only to duplicate the bars of half of the tray to complete any number of grid trays.

Figure 6:
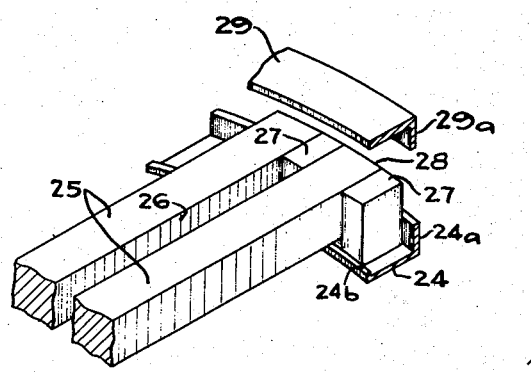
Figs. 6 and 7 are fragmentary isometric exploded views of two modifications.
Figure 7:
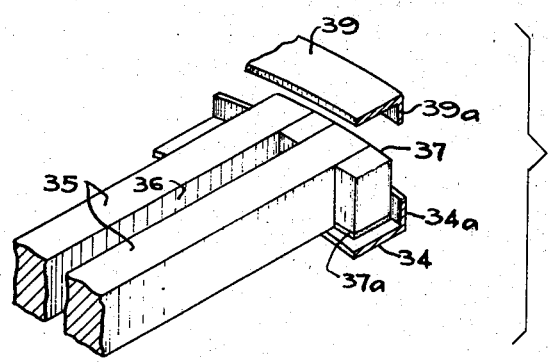

It is evident that modifications may be made in the details of the elements of the tray assembly. Two alternate embodiments, both using independent spacers instead of the integral enlargements 15a—15d on the bars, are shown in Figs. 6 and 7. In both of these views the trays assembly comprises a leveling ring 24 or 34, corresponding to and supported as described for the ring 14; parallel grid bars 25 or 35; and hold-down ring sectors 29 or 39, which are shown in raised position to expose the details, but which are secured in engagement with the grid bars as described for the ring sectors 19. These rings may be formed of two or more sections, as previously described.

Figure 2:
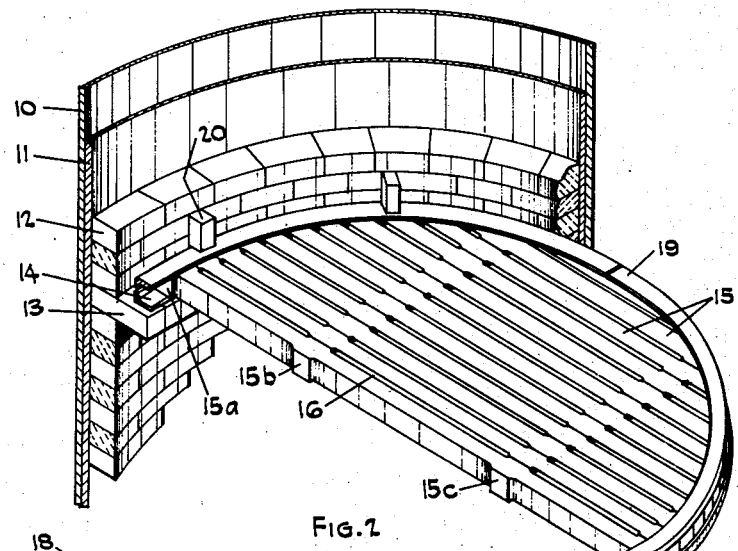
Fig. 2 is a perspective view of a portion of the interior of the column showing the construction.

Referring particularly to Fig. 6, the ring 24 has a high upstanding outer lip 24a and a short upstanding inner lip or flange 24b, forming a trough. Spacer blocks 27 are placed loosely into this trough between the end portions of the grid bars 25, the widths of the blocks being such as to provide slots 26 of the desired widths and the heights that are advantageously equal to the sum of the height of the short lip 24b and the height of the grid bar. The grid bars rest on the upper edge of the lip and the ends 28 of these bars abut the inner surface of the lip 24a. The lips 24a and 24b retain the blocks against radial displacement. The hold-down 29 has a dependent lip 29a; it is placed into engagement with the grid bars and blocks to hold them down and secured as shown in Figs. 1 and 2. Neither the grid bars nor the blocks are cemented in place.

Referring to Fig. 7, the ring 34 has only a single upstanding lip 34a and the spacer blocks 37 are set on the ring with acid-resistant cement, indicated at 37a. They have heights equal to the height of the grid bar, and widths as required to provide slots 36 of the desired width. The grid bars 35 are placed loosely with their end portions against the spacer blocks 37 and resting on the ring 34 but are not cemented. The hold-down 39, having a dependent lip 39a, is placed on the bars and spacer blocks.

By the arrangement of Figures 6 and 7 it becomes possible to employ grid bars that are fabricated with uniform thicknesses throughout their lengths, which is advantageous with certain corrosion-resistant materials.

By this invention the difficulties experienced in casting corrosion-resistant grid trays in larger sections, due to the unequal stresses which develop during the process, are avoided. Such a column is useful, for example, in the distillation of liquid containing sulfuric or other acid. A further advantage is that, if the contingency arises, individual bars can be replaced in the tray assembly at minimum cost.

I claim as my invention:

1. In a grid tray contact column, the combination of an enclosing upright wall defining a contact tank; a peripheral support ledge on the inner face of said wall; an annular leveling support mounted on said ledge; a plurality of discrete grid bars extending across the tank and supported on said leveling support to form a tray, adjacent bars having parts thereof spaced apart to define intervening openings for the passage of substances to be contacted; at least one peripheral hold-down member on the bars near said wall; and means on said wall for retaining said hold-down member in position.

2. In a grid tray contact column, the combination of an enclosing upright wall defining a contact tank; a peripheral support ledge formed on the inner face of said wall; a plurality of discrete grid bars extending across the tank and supported on said ledge to form a tray adjacent bars having parts thereof spaced apart to define intervening openings for the passage of substances to be contacted, at least one peripheral hold-down on the bars near said wall including a plurality of separate ring sectors extending over portions of the periphery, said sectors having lips extending downwards between the grid bars and the said inner face of the wall; and means carried on said wall independently of said ledge for retaining said hold-down against upward displacement while permitting horizontal displacement.

3. In a grid tray contact column, the combination of an enclosing upright wall defining a contact tank; a peripheral support ledge formed on the inner face of said wall; a plurality of discrete grid bars extending across the tank and supported on said ledge to form a tray; a separate spacer block over said ledge situated between the end portions of each pair of adjacent grid bars, whereby said grid bars are spaced apart to define intervening openings for the passage of substances to be contacted at least one peripheral hold-down on the bars near said wall; and means carried on said wall independently of said ledge for retaining said hold-down in position.

4. In a grid tray column adapted for effecting contact between ascending and descending fluent materials, the combination of an enclosing upright wall defining a contact tank and having a ceramic inner face, said inner face being shaped to provide a peripheral support ledge; a leveling support mounted on said ledge by a filler; a plurality of discrete grid bars extending across the tank and supported on said leveling support to form a tray, adjacent bars having parts thereof spaced apart to define intervening openings for the passage of said fluent materials; at least one peripheral hold-down on the bars near the said wall; and a plurality of retaining members for said hold-down secured to the ceramic part of said wall.

5. A construction according to claim 4 wherein said leveling support has an upstanding lip situated outwardly with respect to the ends of the grid bars.

6. A construction according to claim 5 having a separate spacer block situated between the end portions of each pair of adjacent grid bars and above said leveling support, and flange means on said leveling support situated inwardly with respect to the said spacer blocks, whereby said upstanding lip and said flange means are adapted to retain the spacer blocks against displacement parallel to the grid bars.

7. A construction according to claim 5 having a separate spacer block situated between the end portions of each pair of adjacent grid bars and above said leveling support, said spacer blocks being cemented to said leveling support.

8. A construction according to claim 4 wherein said hold-down has a dependent lip situated outwardly with respect to the ends of the grid bars and inside of the ceramic face of the enclosing wall.

9. A construction according to claim 4 wherein said ceramic face of the wall has recesses above the hold-down and said retaining means include ceramic blocks overlying the hold-down and extending into said recesses.

10. A grid tray column adapted for effecting contact between an ascending gas and a descending liquid comprising an upright metal shell defining a contact tank; a ceramic brick lining on the inner face of said wall; and a plurality of grid trays extending across the interior of said tank at different levels thereof with substantial vertical intervals between trays, said brick lining being constructed to provide a peripheral supporting ledge beneath each of said trays and having a plurality of recesses above each of said trays, each said tray including: an annular leveling support mounted on the respective supporting ledge by mortar having an upstanding lip at a radially outer part thereof; a plurality of discrete grid bars extending across the tank within said upstanding lip and supported on said leveling support; spacer means for said bars at longitudinally separated locations to define longitudinal slots between adjacent bars in the longitudinal interval between spacers, said slots having substantially uniform widths throughout the area of the tray and constituting the only opening for the passage of said gas and liquid through the trays; at least one peripheral hold-down on the bars near said brick lining having a dependent lip situated outwardly with respect to the ends of the grid bars; and ceramic retaining keys on said hold-down extending into said recesses.

References Cited in the file of this patent

UNITED STATES PATENTS

| 652,773 | Hirt | July 3, 1900 |
| 1,677,777 | Houseman | July 17, 1928 |
| 1,754,607 | Campbell | Apr. 15, 1930 |

FOREIGN PATENTS

| 869,507 | France | Feb. 4, 1942 |